Dec. 19, 1933.　　　　　L. A. FALLS　　　　　1,939,884
FILM WINDING DEVICE
Filed April 19, 1932　　2 Sheets-Sheet 1
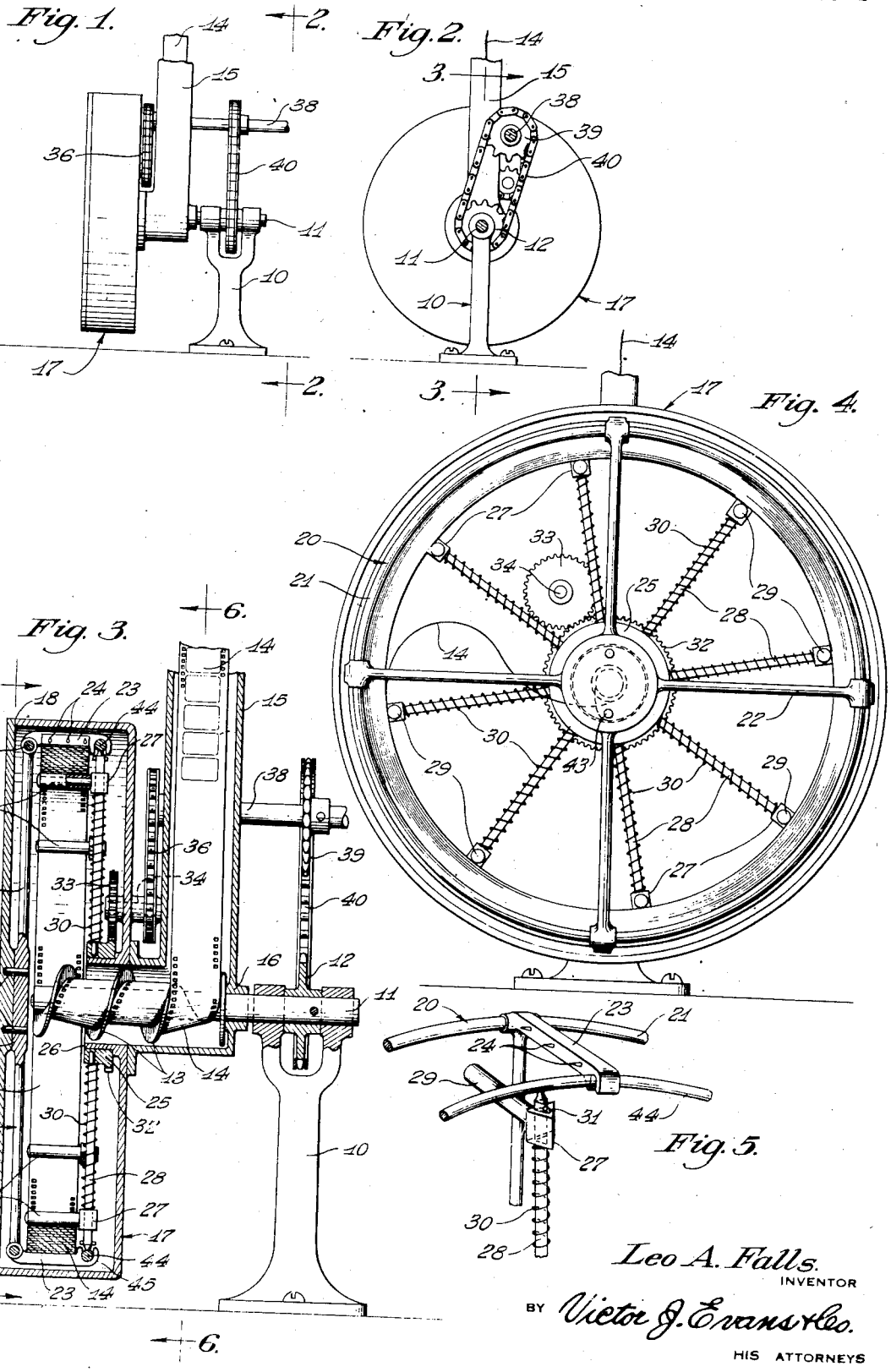
Leo A. Falls.
INVENTOR
BY Victor J. Evans & Co.
HIS ATTORNEYS Dec. 19, 1933.  L. A. FALLS  1,939,884
FILM WINDING DEVICE
Filed April 19, 1932   2 Sheets-Sheet 2
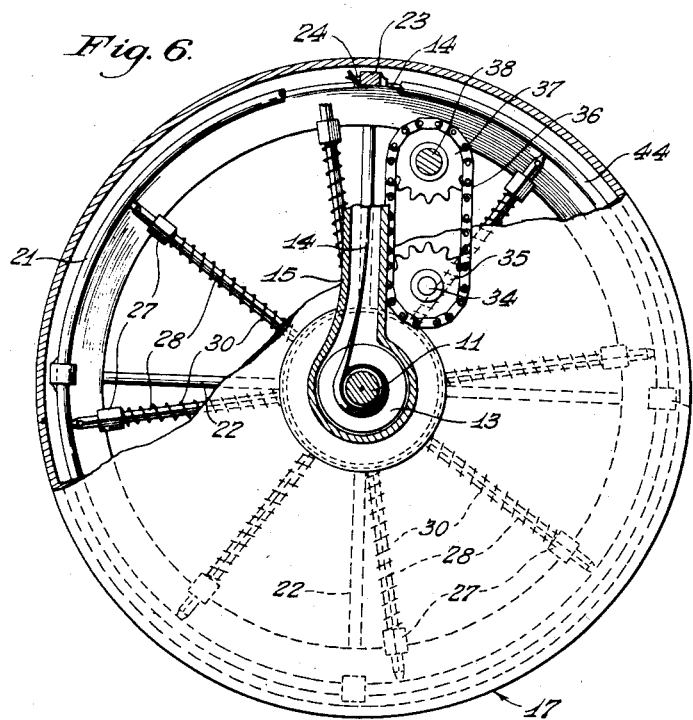
Leo A. Falls.
INVENTOR
BY Victor J. Evans & Co.
HIS ATTORNEYS Patented Dec. 19, 1933

1,939,884

UNITED STATES PATENT OFFICE 1,939,884

FILM-WINDING DEVICE

Leo A. Falls, Chicago, Ill.

Application April 19, 1932. Serial No. 606,230

3 Claims. (Cl. 88—18.7)

This invention relates to certain novel improvements in film-winding devices, and has for its principal object the provision of an improved construction of this character which will be highly efficient in use and economical in manufacture.

In the motion picture art it is customary to wind the film from a feed reel onto a take-up reel and then to rewind the film from the take-up reel back onto another reel in order to bring the head end of the film onto the outermost winding of the film roll in position for projection. This step of rewinding the film requires considerable time and labor and is inconvenient and it is an object of my invention to provide a film-winding device for eliminating this step of rewinding the film whereby to wind the film directly from the feed reel of the projection apparatus onto a take-up reel in such a manner that the head end of the film is disposed on the outermost winding of the film roll in position to be fed directly therefrom through the projection apparatus.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is an elevational view of a preferred form of the invention;

Fig. 2 is a side elevational view on line 2—2 in Fig. 1;

Fig. 3 is a sectional view on line 3—3 in Fig. 2;

Fig. 4 is an elevational view on line 4—4 in Fig. 3;

Fig. 5 is a perspective detail view of a part of my novel reel;

Fig. 6 is a view on line 6—6 in Fig. 3, partly in section and partly in elevation, with a casing part removed to show parts of the reel;

Fig. 7 is a side elevational view on line 7—7 in Fig. 8 with part of the casing removed to show the reel; and Fig. 8 is a sectional view on line 8—8 in Fig. 7.

In the drawings, which illustrate a preferred form of the invention, 10 indicates a support or pedestal having journaled therein a shaft 11 upon which is fast a sprocket 12. Formed on the shaft 11 is a spiral feed screw 13 onto which the film 14 is directed from the projection apparatus through a guide 15. Having a hub 16 floating on the shaft 11 is a casing generally indicated at 17. This casing 17 has an open side 18 over which is arranged a closure plate 19. This closure plate 19 may be attached to the open side 18 of the casing in any suitable manner.

Arranged in the casing 17 is a reel generally indicated at 20. This reel 20 includes a relatively stationary ring member 21 which has radially arranged arms 22 that radiate from a hub 42 to which the closure plate 19 is attached by pins 43.

Mounted on and projecting laterally therefrom at intervals around the ring 21 are film-retaining portions or members 23 which have film-attaching elements 24 thereon. The reel 20 includes a rotative ring member 44 which is guided in portions 45 of the laterally projecting members 23. The reel ring 44 has a hub portion 25 which is rotatably mounted on an annular flange 26 of casing 17. Having their inner ends fastened to the hub 25 and their outer ends attached to the ring member 44 are radially arranged arms 28. These arms 28 are non-circular in cross section and slidably mounted on each arm 28 by means of an apertured sleeve 27 is a film-winding element or roller 29. These film-winding elements or rollers 29 are rotatable within the confines of the portions 23 of stationary ring 21 and are urged radially outwardly of the ring member 44 by means of springs 30 arranged on the radial arms 28; said elements 29 being prevented from rotating or pivoting on the arms 28 by reason of the non-circular cross section of the arms 28 and the corresponding apertures in the sleeves 27. Stops 31 on the arms 28 limit radially outward movement of the film-winding elements or rollers 29.

A gear 32 is formed on the hub 25 of the rotative reel ring 44 and this gear 32 meshes with a gear 33 that is mounted on a shaft 34. The shaft 34 is journaled in a portion of casing 17. Fast on the shaft 34 is a sprocket 35 over which runs a chain 36. The chain 36 transmits motion from a conventionally operated drive shaft 38, through a sprocket 37 on shaft 38 to the sprocket 35 and shaft 34, thence to gears 33 and 32 to rotate the reel ring 44. A sprocket 39 is journaled on the drive shaft 38 and a chain 40 transmits motion from the sprocket 39 on shaft 38 to the sprocket 12 on shaft 11.

Operation: The film 14 is fed from the projection apparatus through the guide 15 and about the spiral feed screw 13. The closure plate is slipped off the pins 43 and the head end of the film 14 is attached to the elements 24 on one of the members 23 on the relatively stationary reel ring member 21. The drive shaft 38 is then operated by conventional means (not shown). Motion is transmitted from shaft 38 through the sprocket 39 and through chain 40 and sprocket 12 to rotate the shaft 11 and the feed screw 13. At the same time the motion of drive shaft 38 is transmitted through sprocket 37, chain 36, sprocket 35, shaft 34, and gears 33 and 32 to rotate reel ring 44 (clockwise Fig. 4); the ring 44 traveling in the guide portions 45 of members 23. As the ring 44 revolves inside the members 23 and relative to stationary ring 22, the spiral feed screw 13 feeds the film 14 into the path of movement of the yieldable film-winding elements 29, between said elements 29 and the film-retaining members 23, and the elements 29 are urged radially outwardly toward the film-retaining members 23 by springs 30; and the rollers 29 on the reel ring 44 engage the film 14 and urge the film outwardly against the film-retaining members 23, thereby winding the film inside the members 23 in such a manner that when a length or roll of film is completely wound up inside the members 23 and tail end of the film is on the innermost winding and the head end of the film is on the outermost winding.

The cover plate 19 may then be slipped off pins 43 and reel 20 with the film 14 may then be removed from the casing 17, and placed as in Fig. 8 in a second casing 17 which is intended to be arranged at the top of the projection machine, the first described casing 17 of Fig. 3 being arranged at the lower part of the projection machine. An empty reel 20 is then placed in the lower casing 17 from which the reel and film have been removed. The head end of the film on the reel 20 in the upper casing 17 is then removed from attaching elements 24 and paid out of slot 41 in the casing through the projection machine and onto the winding device in the lower casing 17 as described.

By the use of my novel film-winding device in the manner hereinbefore described the step of rewinding the film and the labor and time incident thereto are thus eliminated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A film-winding device, comprising a reel including a stationary ring member and a rotative ring member, film-retaining members projecting laterally from said stationary ring member, said film-retaining members including portions guiding said rotative ring member, said rotative ring member including radially arranged arms, film-winding elements slidably mounted on said arms, individual yieldable means on said arms urging said film-winding elements radially outwardly toward said film-retaining members, means for feeding a film into the path of movement of said film-winding elements between the same and said film-retaining members, and means for operating said feeding means and said rotative ring member.

2. A film-winding device, comprising a reel including a stationary ring member and a rotative ring member, film-retaining members projecting laterally from said stationary ring member, said film-retaining members including portions guiding said rotative ring member, said rotative ring member including radially arranged arms, film-winding elements slidably mounted on said arms, individual yieldable means on said arms urging said film-winding elements radially outwardly toward said film-retaining members, a rotative spiral feed screw for feeding a film into the path of said film-winding elements between the same and said film-retaining members, and means for rotating said feed screw and said rotative ring member.

3. A film-winding device comprising a stationary ring member and a rotative ring including radially arranged arms, film-retaining members arranged at intervals around said stationary ring member and projecting laterally therefrom, said film-retaining members having portions guiding said rotative ring member, portions on said film-retaining members for attachment to a film, film-winding rollers slidably mounted on said arms, individual yieldable means in said arms urging said rollers radially outwardly toward said film-retaining members, means for feeding a film into the path of movement of said roller members between the same and said film-retaining members, and means for operating said feeding means and said rotative ring member.

LEO A. FALLS.